United States Patent
Wolfinger et al.

(10) Patent No.: US 11,240,416 B2
(45) Date of Patent: Feb. 1, 2022

(54) WEATHER EVENT VISUALIZATION APPLICATION FOR MOBILE DEVICES

(71) Applicant: DTN, LLC, Omaha, NE (US)

(72) Inventors: Michael Wolfinger, Norman, OK (US); Justin Greenfield, Norman, OK (US); Ross Kimes, Norman, OK (US); Robb Young, New York, NY (US); Stdrovia Blackburn, Norman, OK (US); James T. Johnson, Norman, OK (US); Mark Taylor, Marietta, GA (US); Michael D. Eilts, Norman, OK (US)

(73) Assignee: DTN, LLC, Omaha, NE (US)

( * ) Notice: Subject to any disclaimer, the term of this patent is extended or adjusted under 35 U.S.C. 154(b) by 0 days.

(21) Appl. No.: 16/213,764

(22) Filed: Dec. 7, 2018

(65) Prior Publication Data

US 2019/0109976 A1  Apr. 11, 2019

Related U.S. Application Data

(63) Continuation of application No. 15/083,512, filed on Mar. 29, 2016, now abandoned.

(60) Provisional application No. 62/141,524, filed on Apr. 1, 2015.

(51) Int. Cl.
| | |
|---|---|
| *H04N 5/232* | (2006.01) |
| *G01W 1/10* | (2006.01) |
| *G01S 13/95* | (2006.01) |
| *H04N 5/225* | (2006.01) |

(52) U.S. Cl.
CPC ......... *H04N 5/23206* (2013.01); *G01S 13/95* (2013.01); *G01W 1/10* (2013.01); *H04N 5/2257* (2013.01); *G01W 2203/00* (2013.01); *H04N 5/232939* (2018.08)

(58) Field of Classification Search
CPC ...... H04N 5/23206; G01S 13/95; G01W 1/10
USPC ...................................................... 348/211.3
See application file for complete search history.

(56) References Cited

U.S. PATENT DOCUMENTS

| | | | |
|---|---|---|---|
| 2001/0049584 A1* | 12/2001 | Jones ...................... | G01W 1/06 702/3 |
| 2008/0147730 A1* | 6/2008 | Lee ..................... | G06Q 30/0212 |
| 2010/0240339 A1* | 9/2010 | Diamond ............... | H04H 20/59 455/404.2 |
| 2011/0102192 A1* | 5/2011 | Batsakes .............. | G08G 5/0021 340/905 |
| 2013/0076926 A1* | 3/2013 | Arnold ............... | H04N 5/23203 348/211.99 |
| 2014/0206443 A1* | 7/2014 | Sharp ...................... | G06T 7/593 463/31 |
| 2015/0134252 A1* | 5/2015 | Marshall ................. | G01W 1/10 702/4 |
| 2015/0134320 A1* | 5/2015 | Sridhar ............... | G06F 17/2775 704/2 |

(Continued)

*Primary Examiner* — Usman A Khan
(74) *Attorney, Agent, or Firm* — Kutak Rock LLP; Brian L. Main

(57) ABSTRACT

The present invention essentially comprises an application, software, system, method and combinations thereof that allow using a mobile phone's location-determining capabilities, compass, and camera, an application on the mobile device that can be used to display characteristics of weather within a predetermined distance from the mobile device by querying a remote server to gather information on the attributes about the weather within the predetermined radius of the device location.

18 Claims, 1 Drawing Sheet

(56) References Cited

U.S. PATENT DOCUMENTS

| | | | |
|---|---|---|---|
| 2015/0216448 A1* | 8/2015 | Lotan | A61B 5/6898 600/538 |
| 2015/0232030 A1* | 8/2015 | Bongwald | B60R 1/00 348/115 |
| 2016/0140853 A1* | 5/2016 | Smith | G08G 5/0091 701/415 |
| 2016/0292924 A1* | 10/2016 | Balachandreswaran | A63F 13/32 |

* cited by examiner

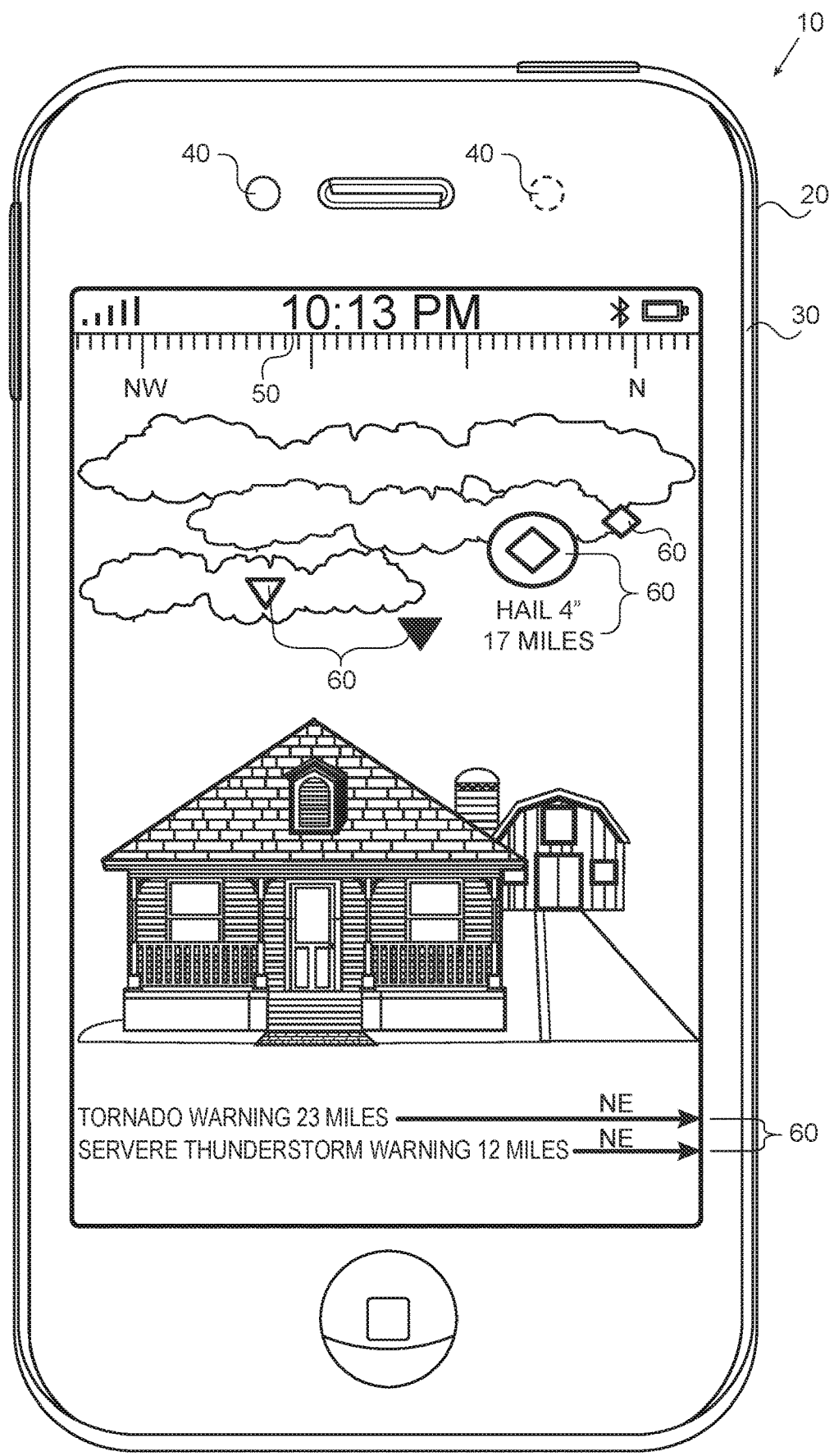

WEATHER EVENT VISUALIZATION APPLICATION FOR MOBILE DEVICES

CROSS-REFERENCE TO RELATED APPLICATIONS

This is a continuation application of U.S. patent application Ser. No. 15/083,512 filed on Mar. 29, 2016 and claims priority to provisional patent application, U.S. Ser. No. 62/141,524, filed on Apr. 1, 2015, and incorporated by referenced herein.

BACKGROUND OF THE INVENTION

1. Field of the Invention

In general, the present invention relates to a mobile device and a method of managing applications and sources for a mobile device related to real time weather information. More specifically but not to be considered limiting, the present invention provides a system and method that allows for a user to receive real time weather related information via a mobile device wherein the user can point at the weather event and have displayed on the device information regarding same in real time.

1. Description of the Prior Art

As known, mobile devices, such as smartphones and tablets, are able to run application software, also termed "apps", to perform tasks. It is also known that many users have applications directed toward weather alerts, weather radar, weather data and so forth. These known applications are often useful, but fail to provide specific needed information for the weather event at the specific location of the user.

By example, people may be outside and can see weather in the distance but have no concept of what the weather situation really is, whether it will affect them at their current or future location, how far away it may be and so forth. Although, views of weather radar are much more common in 2015 than they were many years ago and weather radar displays are a common feature on mobile devices, many people are not comfortable looking at a weather radar display and interpreting the information. To many, the radar may have colors and shapes that do not actually correspond to what they are looking at with the naked eye, which may cause confusion.

The known communications technology regarding weather alerts have provided enormous benefits to consumers. Unfortunately, the ability to receive and utilize information becomes exponentially more complex as the amount of information and multiple means of receiving increases without needed specifics applicable to a user's position.

It is, therefore, desirable to provide an application that would allow a user to point their device at the weather event of interest and learn in real time needed and desired information specific to the point of location. The current methods of weather alerts and notification are insufficient for today's wants. Therefore, a need and a desire exist to provide a new system and method. What is needed is to provide an application that gives the user the specific information in a readable and easy application where the prior art fails.

SUMMARY OF THE INVENTION

In view of the foregoing disadvantages and limitations inherent in the known types of systems and methods now present in the prior art, the present invention provides a new and improved weather event visualization application for mobile devices wherein the same can be utilized to provide a user real time information about an event specific to the exact location. As such, the general purpose of the present invention, which will be described subsequently in greater detail, is to provide a new and improved method and system which allows users to essentially point their mobile device and see information about the specific weather event, which has all the advantages of the prior art systems and methods and provides a new visual information not previously obtainable.

To attain this, the present invention essentially comprises an application, software, system, method and combinations thereof that allow using a mobile phone's location-determining capabilities, compass, camera, a network connection, and an application on the mobile device that can be used to display characteristics of weather within a predetermined distance from the mobile device by querying a remote server to gather information on the attributes about the weather within the predetermined radius of the device location. The gathered information may include the severity of the weather, motion, attributes, potential impact to a user's current location, and so forth.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially, the practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved weather event visualization application for mobile devices that allows a visual reference to where the user may be, the weather event and how it relates to the user and their location. This may minimize the need for the mobile device user to interpret weather information from known applications that do not correspond to the specific location of the user.

It is a further object of the present invention to provide a new and improved weather event visualization application for mobile devices that utilize the common tools available on a mobile device to view weather characteristics that the user can visually see, or potentially not see due to the view being obscured by trees, buildings, and so forth, and query a remote server about the weather situation surrounding the user and or how weather in the area will impact the user.

An even further object of the present invention is to provide a new and improved weather event visualization application for mobile devices, which is susceptible to a low cost of use with regard to both access and implementation, and which accordingly is then susceptible to low prices of use and sale to the consumer, thereby making such economically available to the consumer.

Still another object of the present invention is to provide a new and improved weather event visualization application for mobile devices, which provides all of the advantages of the prior art, while simultaneously overcoming some of the disadvantages normally associated therewith.

Another further object of the present invention is to provide a new and improved weather event visualization application for mobile devices that may be easily and efficiently accessed, implemented, and utilized and, thus, facilitates a desired experience on a mobile device such as but not limited to a smartphone, laptop, tablet, and so forth.

Yet another object of the present invention is to provide a new and improved weather event visualization application for mobile devices that may interpret visual information provided by the user's device and display desired and or pertinent information on the device at the same time.

These, together with other objectives of the invention, along with the various features of novelty, which characterize the invention, are pointed out with particularity in the claims annexed to and forming a part of this disclosure. For a better understanding of the invention, its operating advantages, and the specific objectives attained by its uses, reference should be made to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings and appendices.

FIG. 1 is a general illustration in accordance with a preferred embodiment of the invention.

DETAILED DESCRIPTION OF THE PREFERRED EMBODIMENTS

In a preferred embodiment, the invention may be a system, method, process, method of doing business, and or a computer program with the understanding it may also be combinations of the same. It is understood that the following is for purposes of illustration and should not be considered to limit the scope of the invention. It is understood that the current invention may be utilized for numerous applications other than mobile devices known in the current art. It may be utilized with specific professionals in general as well as other types of products and services. Furthermore, the term "weather" and or "event" should not be considered limiting the scope of the invention.

Referring now to FIG. 1, in accordance with a preferred embodiment of the invention 10, the method and system may provide a means, method, system, computer program, and or combination thereof that may include use of a mobile device 20 having a screen 30, a camera 40, compass application 50 and so forth as known in the art. It is contemplated that invention 10 may provide, in general, weather event and weather information 60 that may be depicted in real time on screen 30 of mobile device 20.

The present invention is generally designed to minimize the need for the mobile device user to interpret weather information by using a mobile device and the common tools available on a mobile device to view weather characteristics that the user can visually see and query a remote server about the weather situation surrounding the device. It is also contemplated to provide information the user may not be able to see directly due to being too far away to be seen and or the view being obscured by trees, buildings, and so forth. The common tools may be a compass, location finding tools, camera, GPS, a network connection, and so forth that may be found on modern mobile devices.

It is contemplated a user would open an application on the mobile device, upon which the application would gather the location of the device from the location determining tools on the device and query the remote server for the location. The server would return weather attributes such as type of precipitation, location, speed and direction of motion, existence of lightning, tornado, high winds, watches or warnings related to the weather event, and so forth. Using the "camera view" within the application, the user could "scan" the sky with the application and the weather characteristics in the 360° view would be displayed as icons on the screen.

If the user wanted more information on a particular area of the sky, the user could select within the application to "investigate" a particular feature and or event. The user would then hold the device such that the weather event and or feature of interest were within the viewing frame of the camera. The user would then select or isolate the weather event and or feature by touching the screen and "pointing" at the event/feature of interest or centering the feature in the image. The application would capture the image viewed and indicate on the image the event and or feature of interest and ask the user to confirm the image. If the user does not feel the image represents what they wanted to know more about, the application would start the camera and ask the user again to "point" to the event and or feature of interest.

If the user felt the image represented what they were interested in and they confirmed with the application, the image, the location, the direction facing, etc. would be sent to a remote server in a query to provide back information on the weather event and or feature. This information would then be returned to the application and displayed in the application for the user.

As an example, a user at the soccer complex can see what appears to be a large cloud or storm to the west of the soccer complex. The user opens the application on their smart phone and the application gathers the location and sends a query to the remote server. While the information is being asked for and returned to the application, the application displays a message to the user that information is being gathered or calculated. Once, the application receives information for all the weather events within a user defined number of miles of the device's location, the user holds the phone up to view the sky within the application and turns or "scans" the sky.

As the device moves around the 360° circle surrounding the device, the weather attributes of weather within the user defined number of miles of the device are displayed on the screen within the application as icons, numbers, vectors, and so forth. When the user has the application "pointed" at the storm that originally piqued their interest, the user taps the screen to indicate what event and or feature in the image they would like to have more information about and "locks" the event/feature into view. After confirming that the image and indicated event and or feature are correct, the location information from the location services from the mobile device, the heading, such as but not limited to direction pointing to, and the image with indicated event and or feature are sent to a remote server.

The remote server analyzes observational weather data such as but not limited to radar, satellite data, surface observations, and so forth, and determines based on the weather data if there is indeed a weather event and or feature based on detection, tracking and prediction algorithms. If there is a weather event and or feature that is detected, predicted or tracked, the attributes, such as a storm that contains hail, tornado, strong winds, lightning, snow, sleet, and so forth, and the direction and speed of motion information is sent back to the user.

Additionally, the information sent to the application, indicates whether the user will be impacted by the event and or feature, when it would start and when it would end. For some users, having additional confirming information would be valuable. Thus, access to view the observation data such as but not limited radar, satellite data, surface observations, and so forth, would be available to user from the application by selecting a "view data" feature and having the application display the data for that particular feature, event, and or location.

In a preferred embodiment, the steps may be:

1) A user opens an application on a device. This may be from curiosity due to visually observing something and or a message from the application indicating something of interest nearby.

2) The application instructs user to "point" the device/application in the direction of a feature of interest by holding the device screen such that it is visible to the user. The camera is activated and its view is shown on the device screen.

3) When the user has the view that they desire, the user selects a button on the screen to "use this view." Information associated with the location and direction of viewing is sent to the server to gather information about possible events in the view/direction of viewing.

4) This information is then sent to the device/application for processing and display on the device screen within the application.

5) A more information button may be available to the user for displaying some of the raw data such as but not limited to radar data, satellite data, observation data, watches/warnings in effect, speed of motion of features/events, and so forth to be shown as confirmation data to the user.

6) The user can start the process over by selection "new view" from the application and pointing the device/camera at another feature.

The invention further contemplates a weather related feature of interest visualization method for use with mobile devices comprising the steps: providing a mobile device having a first side, a second side, a camera on said first side, a display screen on said second side, a compass application for calculating and displaying a compass heading on said display screen, a locating application for positioning said mobile device to a geographical location, a sending unit for transmitting from said mobile device to a network having a server, a receiving unit for receiving from said network and said server; activating said camera of said mobile device; pointing said camera in a direction of said weather related feature of interest wherein said weather related feature of interest has an associated geographical position; displaying said weather related feature of interest on said display screen of said mobile device; transmitting said positioning of said mobile device said geographical location via said sending unit to said network and said server; transmitting said compassing heading of said mobile device via said sending unit to said network and said server; gathering information about said weather related feature of interest weather via said server; transmitting said information about said weather related feature of interest to said mobile device said receiving unit via said server and said network; and displaying said information about said weather related feature of interest on said display of said mobile device.

The invention still further contemplates a weather related feature of interest visualization method for use with for mobile devices wherein said information includes radar data; satellite data, observation data; weather watches and or warnings; weather reports from weather spotters; weather reports from the general public, weather analytics such as but not limited to detection of hail, mesocyclone, tornado, lightning, and or speed of motion and direction of said weather related feature of interest.

The invention may still further contemplate a weather related feature of interest visualization method for use with for mobile devices wherein said activating said camera of said mobile device is prompted by said server via said network and transmitted to said mobile device receiving unit from said network and said server.

Operations System and Miscellaneous

The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a private network, virtual private network, a wide area network, a point-to-point dial-up connection, combinations thereof and so forth.

It is contemplated that the invention will utilize a computer database accessible through a web-based program, communications system, network, and combinations thereof. The system may have registered members and or subscribers who may opt in or pay to be included in the system and who may have access to other information from other members, subscribers, and so forth. It is still contemplated, that a preferred construction will be a mobile device based application with issued access to members and other selected members, databases and so forth. Members may pay per use, time frame orientation, or number of uses or access. It is further contemplated that member-to-member operations may include referral fees, awards, bonuses, benefits and the like. In another preferred embodiment, the invention may be carried out as an independent operating system, non-independent operating system, or with features of both.

In a preferred embodiment, the invention may generally utilize a mobile device and or computing system. The system may include various input/output (I/O) devices (e.g., mouse, keyboard, display, Internet-enabled mobile phone, and Internet-enabled PDA) and one or more general purpose computers having a central processor unit (CPU), an I/O unit and a memory that stores data and various programs such as an operating system, and one or more authoring applications (e.g., programs for word processing, creating spread sheets, and producing graphics), one or more client applications (e.g., programs for accessing online services), and one or more browser applications (e.g., programs for retrieving and viewing electronic documents from the Internet and/or Web). The computer system may also include a communications device (e.g., a satellite receiver, a modem, or network adapter) for exchanging data with a host through a communications link (e.g., a telephone line and/or a wireless link) and/or a network.

It is contemplated that the invention may be activated, accessed, utilized and so forth by the use of a mobile phone icon and or computer screen related desktop icon for instantaneous retrieval. It is understood that in a preferred embodiment, the icon will be located on a start page and or in a lower location such as but not limited to a tool bar commonly associated at the bottom right of a computer screen. The invention may be accessed by other means and the icon use should not be considered limiting the scope of the invention. The invention may be utilized with any and all types of internet communication portals, communications systems, and combinations thereof. Further, the invention should not be considered limited to existing systems and that the invention may be utilized with other types of internet and communication portals.

Likewise, it is contemplated that the invention may be utilized in other means other than a personal computer screen application. It may be utilized with mobile, hand held devices, cellular phones, PDAs, and car computer systems or displays. It also includes devices that are mobile, devices that are stationary and or devices that are a combination of mobile and or stationary. It is further contemplated that the invention may be utilized with public phones that may include a visual screen or display to replace or enhance existing phone booths. Likewise, free standing kiosks, booths or other locations may be specifically established to provide a display and access to the invention and said invention may include such established physical access ports, places, kiosks, and the like.

It is still contemplated that the invention may include, utilize, be selectively accessed by specified groups or sub groups, such as a designated entity like a team, community, club and so forth. It is contemplated that the invention may include specific promotional materials that companies have produced and would pay the manufacturer or business to appear on line with the business that is listed or has an ad or website. This would include any and all types of information including local, regional, national, international and worldwide. It can be placed permanently or temporarily including websites, ads, commercials and any and all types of promotions, advertising, informational and communication data and not excluding any other form or type of knowledge.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

I claim:

1. A visualization method for use with mobile devices having a camera, a display screen, a compass application, a locating application, a sending unit for transmitting from said mobile device to a network having a server, and a receiving unit for receiving from said network and server, the method comprising:
   determining a first geographical position, the first geographical position being the location of said mobile device;
   activating said camera of said mobile device;
   pointing said camera in a direction of a weather feature, the weather feature being a weather related feature of interest, wherein said weather feature has an associated second geographical position;
   displaying said weather feature on said display screen of said mobile device;
   transmitting said first geographical position via said sending unit to said network and said server;
   calculating a first compass heading;
   transmitting said first compass heading via said sending unit to said network and said server;
   gathering information about said weather feature via said server;
   transmitting said gathered information to said mobile device by said receiving unit via said server and said network; and
   displaying said gathered information on said display of said mobile device.

2. The method of claim 1 wherein said gathered information includes radar data.

3. The method of claim 1 wherein said gathered information includes satellite data.

4. The method of claim 1 wherein said gathered information includes observation data.

5. The method of claim 1 wherein said gathered information includes weather watches and or warnings.

6. The method of claim 1 wherein said gathered information includes weather reports from weather spotters.

7. The method of claim 1 wherein said gathered information includes weather reports from the general public.

8. The method of claim 1 wherein said gathered information includes weather analytics.

9. The method of claim 1 wherein said gathered information includes speed of motion and direction of said weather feature.

10. The method of claim 1 wherein activating said camera of said mobile device is prompted by said server via said network and transmitted to said mobile device receiving unit from said network and said server for a user to activate said camera.

11. The method of claim 1, wherein the first geographical location is displaced from the second geographical location.

12. The method of claim 11, wherein the first compass heading is calculated while the camera is pointing in the direction of said weather feature and wherein the gathered information comprises the second geographical location.

13. The method of claim 12, further comprising identifying the weather feature based on the first geographical location and the first compass heading.

14. The method of claim 11, further comprising identifying the weather feature based on the first geographical location and the first compass heading.

15. The method of claim 1, wherein the gathered information comprises the second geographical location.

16. The method of claim 15, further comprising identifying the weather feature based on the first geographical location and the first compass heading.

17. The method of claim 1, further comprising identifying the weather feature based on the first geographical location and the first compass heading.

18. The method of claim 17, wherein the first compass heading is calculated while the camera is pointing in the direction of said weather feature.

* * * * *

UNITED STATES PATENT AND TRADEMARK OFFICE
CERTIFICATE OF CORRECTION

| | |
|---|---|
| PATENT NO. | : 11,240,416 B2 |
| APPLICATION NO. | : 16/213764 |
| DATED | : February 1, 2022 |
| INVENTOR(S) | : Michael Wolfinbarger et al. |

It is certified that error appears in the above-identified patent and that said Letters Patent is hereby corrected as shown below:

On the Title Page

Item (12): delete "Wolfinger" and insert --Wolfinbarger--

Item (72) Inventors: delete "Wolfinger" and insert --Wolfinbarger--

Signed and Sealed this
Twenty-third Day of August, 2022

Katherine Kelly Vidal
*Director of the United States Patent and Trademark Office*